Feb. 26, 1957 K. WILFERT 2,783,365
INTERIOR LIGHTING SYSTEM FOR MOTOR VEHICLES
Filed March 24, 1954
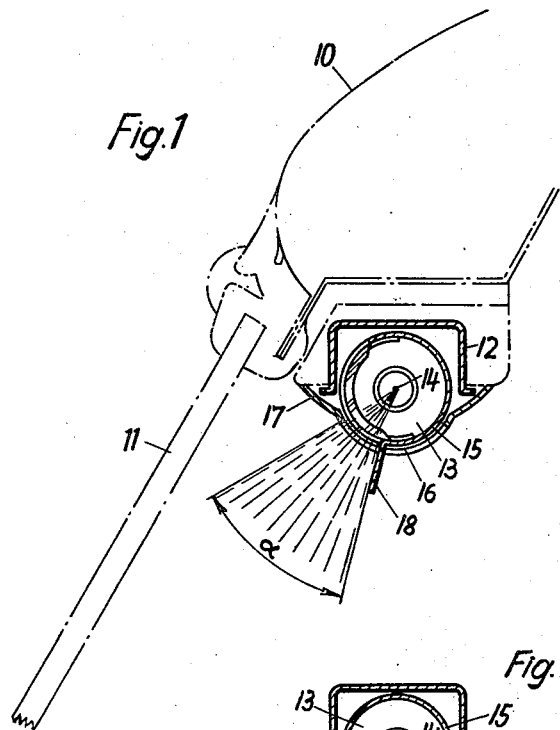
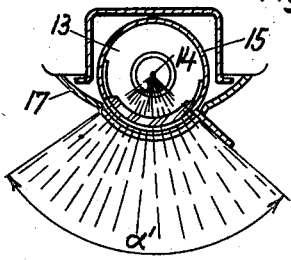
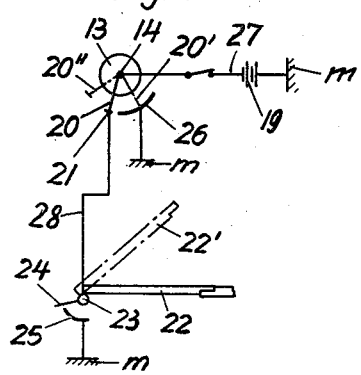
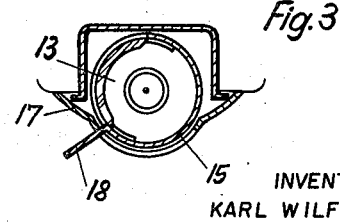
INVENTOR.
KARL WILFERT.
BY *Dicke and Craig.*
ATTORNEYS.

United States Patent Office 2,783,365
Patented Feb. 26, 1957

2,783,365

INTERIOR LIGHTING SYSTEM FOR MOTOR VEHICLES

Karl Wilfert, Stuttgart-Degerloch, Germany, assignor to Daimler-Benz Aktiengesellschaft, Stuttgart-Unterturkheim, Germany Application March 24, 1954, Serial No. 418,327

Claims priority, application Germany March 26, 1953

3 Claims. (Cl. 240—7.1)

The present invention relates to an interior lighting system for motor vehicles. More particularly, the present invention relates to the interior lighting system for motor vehicles which is actuated automatically by the opening and closing of the door, and in which the automatic actuating mechanism may be turned off manually so as to subject the lighting system to manual control.

It is accordingly an object of the present invention to provide an improved interior lighting system for motor vehicles which is more versatile and flexible in its use.

It is another object of the present invention to provide an interior lighting system for motor vehicles which may be turned on and off either automatically or manually as desired by the driver.

It is still a further object of the present invention to provide an interior lighting system for motor vehicles in which the mechanism determining either automatic or manual operation thereof effectively varies at the same time the area covered by the particular light of the interior lighting system of the motor vehicle.

A still further object of the present invention resides in the provision of an overhead light for motor vehicles which illuminates the dashboard when placed into automatic operation whereby the light is turned on and off by the opening and closing of the door, and which illuminates the entire front seat area of the vehicle when turned on by the manual switch so as to be turned on continuously.

It is another object of the present invention to provide an interior lighting system for motor vehicles which may be operated automatically by the opening and closing of the door, and which includes a switch which disables the automatic operation of the lighting system, so that the same may be turned on manually for continuous operation or may be turned off manually, whereby the opening and closing of the door is rendered ineffective.

Interior lights are known with motor vehicles, which are turned on and off automatically in dependence on the opening and closing of the door, whereby during opening of the door the lamp, which is located within the range of the driver seat, is automatically turned on. This arrangement offers the advantages that during boarding of the vehicle by the driver the dashboard with its various controls are immediately illuminated, so that the actuation of a particular control is avoided in darkness. On the other hand, such an arrangement of an interior lighting system for purposes of boarding exhibits the disadvantage that the illumination is also turned on under those conditions, when the turning on thereof is not desirable.

The present invention has as its primary object the elimination of this disadvantage and consists in the provision of a switching arrangement by means of which the automatic operation of the door through opening and closing thereof may be eliminated. Such switching arrangement may simultaneously serve the purpose of turning on and turning off the interior lighting device as may be desired.

Furthermore, the switching device is combined in a particularly advantageous manner with an arrangement, which effects or permits the illumination of a larger area of the interior of the vehicle or of the entire interior of the vehicle while the interior boarding light of the vehicle is switched from automatic operation to continuous operation thereof. In connection therewith, for example, a movable or pivotable cover may be provided which regulates the amount of light emitted by the lamp by adjusting the size of the light beam or the light cone while simultaneously with the displacement of the cover the circuit for the electric current is switched into its various positions corresponding to the off-position, the automatic operation, and the on-position.

Further objects, features and advantages of the present invention will become more obvious from the following description when taken in connection with the accompanying drawing which shows for purposes of illustration only one preferred embodiment in accordance with the present invention, and wherein Figure 1 is a cross-sectional view of an interior light of a motor vehicle in its position for automatic operation, Figure 2 is a cross-sectional view of the interior light shown in Figure 1 in its position of continuous operation, Figure 3 is a cross-sectional view similar to Figure 1 with the light in its permanently off-position, and Figure 4 is a schematic diagram of the electric switching circuit used in connection with the interior light shown in Figures 1 through 3.

Referring now more particularly to the drawing, wherein like reference numerals are used throughout the various views thereof to designate like parts, reference numeral 13 designates the lamp or light used as interior light of the vehicle. The lamp or light 13 is arranged in a U-shaped cross-beam 12 below the roof 10 of the vehicle and essentially above the windshield 11. The lamp or light 13 is pivotally mounted about an axle 14 and includes a cylindrical cover 15. One end of the cylindrical cover 15 is bent outwardly in a radial direction so as to extend through a slit 16 formed in an external cover member 17 for the light, which cover member may be formed, for example, of sheet metal. The outwardly extending bent portion 18 of the cover 15 serves simultaneously as manual handle and as light shield or deflector for the rearwardly directed light of the lamp 13.

Figure 4 shows in simplified form the schematic diagram of the switching arrangement in accordance with the present invention. The lamp 13 is energized from any convenient source of electric power, such as the battery 19, one side of which is grounded, and the other side of which is connected to one terminal of the lamp 13 through the electric line or circuit 27. The other terminal of the lamp 13 is electrically connected with the axle 14. The switch arm 20 is rotatably and electrically connected with the axle 14. The switch arm 20 may assume one of three positions, indicated in Figure 4 as 20, 20' and 20''. In the position 20, which is the center position of the switch arm, the switch arm engages contact 21 to form an electric circuit therewith. The contact 21 is electrically connected with a switch arm 24 provided in the rotating axis 23 of the door 22. When the door 22 assumes its open position 22' the switch arm 24 engages a contact member 25 which in turn is connected to ground so that a continuous electrical current is provided from battery 19 over line 27, lamp 13, axle 14, switch arm 20, contact member 21, line 28, switch arm 24, contact member 25 through ground back to battery 19, whereby the lamp 13 is energized.

In the position 20', the switch arm 20 is brought in contact with the contact member 26 which is permanently connected to ground so that the lamp 13 is continuously energized over a circuit from the battery 19 through line 27, lamp 13, axle 14, switch arm 20, contact member 26 through ground back to battery 19.

In the position of the cover 15, illustrated in Figure 1, which corresponds to the center position of switch arm 20, the cover 15 is so positioned, that an opening angle $\alpha$ remains between the cover 15 and the outer cover member 17.

As pointed out above, in that position the switch arm 20 is in contact with the contact member 21. However, with the door closed, which corresponds to the position shown in full line in Figure 4, the electric circuit for energization of the lamp 13 is interrupted by reason of the fact that the switch arm 24 is not engaging the contact member 25. If now the door is opened, so that it will assume its position 22', then the lamp will be energized since the electric circuit is closed by reason of the fact that the switch arm 24 engages the contact member 25. In that position, corresponding to the position shown in Figure 1, a light beam or ray having an angle $\alpha$ is cast into space in front of the driver seat which may be so arranged as to illuminate the dashboard only.

If the cover 15 is rotated counter-clockwise by means of the handle 18 into the position illustrated in Figure 2, which corresponds to the position 20' of the switch arm, then the angle of the light beam is increased to, for example, a value of $\alpha'$. In that position the entire front part of the vehicle interior or the entire vehicle interior may be illuminated.

If the cover 15 is rotated clockwise by means of handle 18 so as to assume the position shown in Figure 3, which corresponds to the position of the switch arm shown in Figure 4 and designated with numeral 20", then the cover 15 or the handle 18 abuts against the outer cover member 17 and the interior of the cover 15 is sealed against the vehicle interior, so that no light can pass from within the cover 15 to the outside thereof. At the same time, the electric circuit for energizing the lamp 13 is permanently interrupted by reason of the fact that the switch arm 20 assumes its position 20" in which it does not engage any contact member, so that the lamp 13 is de-energized and energization thereof is rendered impossible, even if the door is opened.

It is understood that in the position illustrated in Figure 3, the lamp 13 may remain energized, as it is completely covered by cover 15 so that no light can pass into the vehicle interior. However, this would result in unnecessary consumption of electric current. It is also possible to darken or blacken-out the lamp by an arrangement which is physically or spatially separated from the electric switching arrangement.

While I have shown and described one preferred embodiment of my invention, it is understood, that the same is not limited thereto, but is susceptible of various changes and modifications, as known to a person skilled in the art, and I intend to cover all such changes and modifications, except as defined in the appended claims.

I claim:

1. The combination of an interior boarding light for motor vehicles, comprising means for energizing and de-energizing said light in response to opening and closing of the vehicle door with means for rendering said automatic means ineffective, the last-named means including control means for continuously energizing or de-energizing said light, said light including a pivotal cover connected with and adapted to actuate said control means and adjustable into three positions, in one position of which a relatively large light beam is emitted by said light while said light is continuously energized, in a second position of which a relatively small light beam is emitted by said light while said light is under the control of said automatic means, and in the third position of which said light beam is completely cut off while said light is permanently de-energized.

2. The combination according to claim 1, wherein said light includes an external cover member provided with a slit, and said cover is provided with a handle extending outwardly through said slit, the extension of said cover simultaneously serving as a shield for the light in the rearward direction.

3. A vehicle lighting system comprising a light source, screen means for said light source, adjusting means for adjusting said screen means, a switching system for said light source including a door switch for energizing and de-energizing said light source in response to opening and closing of the vehicle door and switch means for selectively energizing and de-energizing said light source independently of the opening and closing of the vehicle door, both said door switch and said switch means being operatively connected with said adjusting means to energize said light source by said switch means independently of said door switch with said screen means in a relatively widely opened position and to energize or de-energize said light source by said door switch in response to opening or closing of said vehicle door respectively with said screen means in a relatively less widely opened position.

References Cited in the file of this patent

UNITED STATES PATENTS

| | | |
|---|---|---|
| 971,351 | Bohan | Sept. 27, 1910 |
| 1,009,956 | Cravens | Nov. 28, 1911 |
| 1,326,380 | Veigal | Dec. 30, 1919 |
| 2,212,664 | Kuhnel | Aug. 27, 1940 |